United States Patent [11] 3,611,001

[72] Inventor James R. Bacon
Philadelphia, Pa.
[21] Appl. No. 821,608
[22] Filed May 5, 1969
[45] Patented Oct. 5, 1971
[73] Assignee Burroughs Corporation
Detroit, Mich.

[54] HIGH-SPEED CURRENT-SWITCHING AMPLIFIERS
15 Claims, 3 Drawing Figs.

[52] U.S. Cl. .......... 315/18, 315/27 TD
[51] Int. Cl. .......... H01j 29/70
[50] Field of Search .......... 315/27 TD, 18

[56] References Cited
UNITED STATES PATENTS
3,479,553 11/1969 Yanishevsky .......... 315/18
3,325,803 6/1967 Carlock .......... 315/18 X

*Primary Examiner*—Rodney D. Bennett, Jr.
*Assistant Examiner*—Joseph G. Baxter
*Attorney*—Carl Fissell, Jr.

ABSTRACT: Deflection control amplifiers for display devices having opposed deflection control windings, including a differential amplifier stage, a two-stage output amplifier electrically connected for receiving control signals from the differential amplifier stage and for providing feedback signals to it, and current switch means electrically connected to the amplifier output terminals, to a source of switching potential and to the deflection control terminals for rapidly switching current between them, responsive to the control signals. Also provided is means for applying an increased bias potential to the deflection control terminals whenever the output signal is less than a predetermined percentage of the control signal magnitude.

PATENTED OCT 5 1971 3,611,001

Fig. I

INVENTOR.
JAMES R. BACON
BY George L. Kensinger
ATTORNEY

INVENTOR.
JAMES R. BACON
BY George L. Kensinger
ATTORNEY

INVENTOR.
JAMES R BACON
BY George L. Kensinger
ATTORNEY

HIGH-SPEED CURRENT-SWITCHING AMPLIFIERS

BACKGROUND OF THE INVENTION

This invention relates to amplifiers for rapidly switching current between different output circuits. More particularly, the subject invention relates to high-speed current-switching amplifiers for deflection control signals in electrically operated display apparatus.

Various electrically operated display devices requiring the very fast switching of drive current between different control circuits or windings are often needed in new systems and new applications. Such displays are utilized, for example, in data communication, data processing and passenger reservation and services systems, as in the airline industry. Other uses for such devices are displaying data in information retrieval systems and displaying graphic and alphanumeric information in such systems.

In many of these applications the data, if to be displayed by a cathode-ray tube (CRT), must be refreshed many times a second in order that it appear as a flicker-free display to the operator. The rate of displaying the data must be sufficient to allow an entire page of information or an entire drawing to be refreshed 30 to 60 times each second. The current-switching amplifier of the present invention is useful as a deflection amplifier for enabling CRT displays to meet these requirements.

One of the most important display techniques in such systems has been termed the Random Scan mode. This technique may also be called Direct Writing or Digitally Controlled Scan. In this technique the deflection and blanking of the electron beam in CRT device is controlled by a computer or the local memory in an associated system. This allows the operation of the device to be controlled in any order or sequence required by the system. Signals from a computer cause the deflection amplifier to position the electron beam at a selected location on the face of the CRT for the start of a writing operation under its control. The beam is blanked during the positioning process and then unblanked for the writing operation. After writing a line or a line segment, the beam may be blanked again and repositioned to the next prescribed location. This process continues until the entire message or drawing is displayed. The message is repeated at a sufficient rate to prevent flicker in the display. The type of information written usually consists of lines and alphanumeric symbols, and may also include such items as dots, special symbols, arcs and circles.

After being positioned to the starting point and unblanked, the beam is then moved at an approximately constant velocity to the end point of the particular line segment being drawn and again blanked. The voltage ramps required to draw such line segments are produced by circuitry which receives a digital input from the system and drives the deflection amplifier. This translation and drive circuitry is referred to as a vector or line generator. Its input signals may define the angle and length of the vector to be drawn, for example. The analog information signal produced by the generator is applied to a deflection amplifier where it is mixed with position information. This procedure allows a vector or line segment to be drawn from any starting point and to terminate at any point on the display surface.

When a display is positioning the beam on the face of a cathode-ray tube, the beam must be settled to within a very high degree of accuracy before writing may begin. If the beam were still moving as a result of receiving a position command, the displayed symbol or vector would be distorted. The amplifier, therefore, must have excellent transient response and must not exhibit any long time constants in its gross-position signal-response characteristics which would prevent settling within the required time. In order to achieve this characteristic the Bodé plot of the amplifier should exhibit the characteristic of a single time constant over its entire range at least until it crosses the 0 db. level. It is, however, extremely difficult to match several time constants accurately enough in order to assure this type of transient response. As a result, the amplifier should have a very high bandwidth before phase-gain control networks are inserted. The phase-gain characteristic may then be controlled by a single network which exhibits a single pole. Any gain-phase correction required for high-frequency operation must also be kept to a minimum.

If the open loop characteristic of the amplifier is very closely approximated by a single time constant over the region of interest, the transient response of the closed loop amplifier will be purely exponential. The settling time can then be accurately estimated, based upon the frequency cutoff characteristics of the closed loop amplifier. Any ringing in the small signal step response will also detract from settling, however.

In addition to the settling requirements, it is also necessary that the amplifier be immune to hum and noise on the power supply lines. Any noise in the output signal will detract from the quality of the display. The use of degenerative feedback minimizes this effect and the use of differential stages in such amplifiers, due to their relatively good common mode rejection, also aids in achieving noise-free output signals.

To display vectors well, the deflection amplifier should be quite linear in handling voltage ramps. It is common for feedback amplifiers to have difficulty in handling steep or sharp ramp signals, however, due to their inherent nonlinearity. Nonlinearity causes such amplifiers to produce hooks and wiggles in vector displays which are both noticeable and distracting to the operator. In some applications for deflection amplifiers, the velocity of the vectors must, moreover, be held constant. This is necessary for minimizing brightness variations from vector to vector.

In the display of alphanumeric information it is also necessary to have good linearity, good transient response and sufficient bandwidth so that the voltage ramps describing the symbols are not distorted by the amplifier. If the transient response characteristics are not excellent, the symbols will exhibit ringing and distortion. The linearity requirement is the same as that encountered in vector display. A large amplifier bandwidth is necessary in order to prevent rounding of the symbols. If sufficient bandwidth is not present in the amplifier the letter S and the numeral 5 will lose their unique identity and become confused since the S and 5 are principally distinguished by the sharp corner on the 5. If insufficient bandwidth is present, the sharp corner becomes rounded and it becomes difficult to differentiate the two symbols. A ratio of unity between the reciprocal bandwith and the stroke writing time is usually sufficient to prevent excessive rounding. Values greater than unity cause excessive rounding and values below this ratio do not improve clarity significantly but will, moreover, increase the noise present on the symbol due to the increase in amplifier bandwidth. Thus, increasing the amplifier bandwidth by increasing the frequency response beyond this point is not necessarily advantageous. Excessive bandwidth might produce an undesirable display due to a consequential increase in noise sensitivity. Another technique to prevent the drawing of rounded corners may be seen in the J. E. Stine U.S. Pat. application Ser. No. 553,399, filed on May 27, 1966, and of common ownership herewith.

High-speed curent-switching amplifiers are useful in CRT display devices which utilize magnetic deflection coils for their control. Magnetic deflection in such devices is advantageous since the coils may be connected directly to the deflection amplifier without the need of cathode bias potentials. It is also generally preferred to use magnetic deflection whenever possible because of its lower cost and its presentation of better defined spots and lines due to better resolution.

SUMMARY OF THE INVENTION

Accordingly, it is an object of the present invention to increase the speed of switching in current-switching amplifiers.

Another object of this invention is to increase the speed of writing information on electrically controlled display devices without reducing efficiency.

A further object of the subject invention is to more rapidly switch conduction in dual channel current amplifiers without correspondingly increasing power dissipation in the amplifier during independent operation of either channel.

A still further object of this invention is to increase the linearity and the bandwidth of signal response in high-speed amplifiers provided for driving center biased, opposed CRT deflection control windings.

In accordance with these objects there is provided a high-speed current-switching amplifier having at least two output terminals and including a temporary current path for the output driver stage, which path becomes conductive during the switching of current from one terminal to another. Suitable asymmetrically conductive circuit elements couple an output terminal and a bias terminal to each output driver for providing alternate current paths for the drivers. Changes in the input signal polarity cause the output current to switch from one driver to another. Current for the output driver to be turned on is conducted by the temporary current path during the switching transition.

The output driver stage is adapted to respond to differential control signals which may be provided by a differential input amplifier biased by a reference voltage.

The invention is especially suited for driving a two-terminal inductive device or a pair of inductive loads such as solenoids, relays or windings. When provided for driving opposed deflection control windings of cathode-ray tubes, a centering bias voltage may be provided as a reference for the input amplifier.

Each channel of the output driver stage, furthermore, may comprise at least two drivers coupled in tandem, the first of which is prevented from saturating and the second of which is permitted to saturate lightly, under control of circuit parameters. Degenerative feedback may be coupled from the first output driver to the amplifier input circuit for increasing the bandwidth and the stability of the amplifier signal response.

There is provided means for symmetrically controlling the gain of dual channel current amplifiers about a common reference voltage such as the centering voltage for a CRT display device. Also provided are circuit elements to compensate for the nonlinear frequency response of critically damped utilization devices such as CRT deflection coils. Other unobvious features and advantages of the invention are made clear in the following detailed description relating to the attached drawings, wherein:

FIG. 1 is an electrical schematic circuit diagram of a CRT deflection control amplifier employing this invention; and FIGS. 2 and 3 are electrical schematic circuit diagrams of further embodiments of applicant's invention adapted for CRT deflection control.

DETAILED DESCRIPTION OF THE PREFERRED EMBODIMENTS

Figure 1:
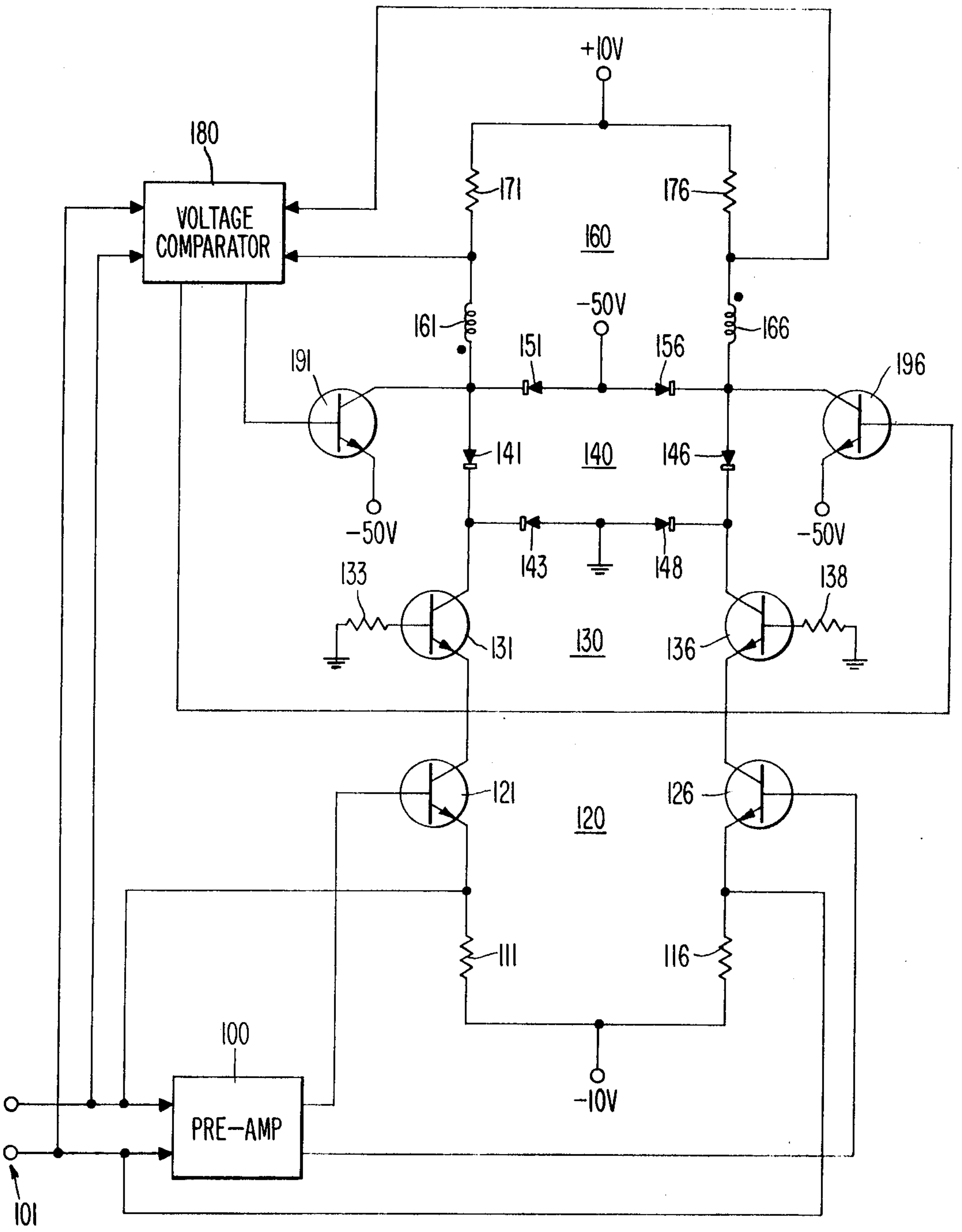

In FIG. 1 is shown a CRT deflection control amplifier including a preamplifier 100, common emitter output stage 120 and common base output stage 130 coupled to deflection yoke 160 through current switch 140. Preamplifier 100 receives input signals on input terminal 101 and differentially controls common emitter connected transistors 121 and 126 which independently control common base connected transistors 131 and 136 for independently driving deflection yoke windings 161 and 166, respectively. Windings 161 ad 166 are opposed to each other as indicated by the dot notation shown in the figure. These windings, when driven by the respective output transistors 131 and 136, cause opposite deflection of the electron beam in a CRT to which they are coupled.

Normal operating bias is applied to the amplifier output stages between the +10-volt terminal at the top of the figure and the −10-volt terminal at the bottom of the figure. One output channel of the amplifier is comprised of resistor 111, transistors 121 and 131, and diode 141, all connected in series. A second output channel of the amplifier is comprised of resistor 116, transistors 126 and 136, and diode 146, also connected in series. Winding 161, connected in series with resistor 171, is driven by the first amplifier channel and winding 166, connected in series with resistor 176, is driven by the other channel. Degenerative back is connected from the junction of resistor 111 and the emitter of transistor 121 and from the junction of resistor 116 and the emitter of transistor 126 to the input terminals of preamplifier 100.

Current switch 140 operates to isolate the output transistor stages from the inductive yoke windings and provides a temporary current path for the output stages when conduction is being switched from one side or channel of the amplifier to the other. When an input signal arrives on input terminals 101, preamplifier 100 and common emitter connected stage 120 respond linearly and feedback from the emitters of transistors 121 and 126 is almost immediately available to the preamplifier. This is different from previously known circuits such as those of Stanley U.S. Pat. No. 2,964,673 and Kozikowski U.S. Pat. No. 3,303,380, in which the feedback signal is delayed until current builds up in the yoke windings. An advantage of applicant's system is that at least a portion of the output stage operates in the linear mode and current therein is settled to a very high degree of accuracy after the input signals are received.

Current from grounded emitter output stage 120 is applied to grounded base output stage 130. The emitters of common emitter connected transistors 121 and 126 are connected to the −10-volt terminal through resistors 111 and 116, respectively. The emitters of common base connected transistors 131 and 136 are connected to the collectors of common emitter transistors 121 and 126, respectively, from which they are driven.

Current switch 140 is comprised of asymmetrically conductive circuit elements such as diodes 141 and 146 coupling yoke windings 161 and 166 to the collectors of transistors 131 and 136, respectively, and of diodes 143 and 148 coupling a ground potential terminal to the respective collectors of transistors 131 and 136. Any positive potential less than +10 volts may be connected to the junction of diodes 143 and 148 since the base electrodes of transistors 131 and 136 are grounded and the positive circuit bias is +10 volts.

The grounded base output stage provides the capability of withstanding large flyback voltages generated by the inductive loads when current is switched from one to the other. Clamp diodes 151 and 156 are connected between a −50-volt terminal and the driven end of the loads, to clamp the flyback voltage excursion at a negative level as it is induced in the winding being activated.

If desired, the grounded base output stage could be eliminated and clamp diodes 151 and 156 could be referenced to a low voltage sufficient to protect the common emitter stage transistors. This, however, would decrease the rate of change of flux in the load windings and would delay the switching of current from one winding to the other. It would decrease the effective bandwidth of the amplifier and result in saturation of the output driver.

Current switch 140 stears the current to yoke windings 161 and 166 responsive to the input signals and prevents the output stage from saturating during transitions. Saturation of the output stages would result in excessive storage delays in the transistors. The grounded emitter output stage is operated in approximately Class B with a small current allowed near the common operating point in order to prevent crossover distortion.

Operation of the circuit of FIG. 1 may be analyzed by assuming the conduction of current by output winding 161 and its current driver transistors 121 and 131, with no current conduction in the other side of the amplifier. If this situation has existed indefinitely, the potential at the collector of transistor 131 is a positive 7 or 8 volts, allowing for voltage drops in diode 141, winding 161 and resistor 171.

Differential input control signals for switching conduction from winding 161 to winding 166 are applied to the base-emitter circuits of transistors 121 and 126 by preamplifier 100, turning transistor 121 off and transistor 126 on. This current change is immediately transferred to the emitters of transistors 131 and 136, turning transistor 131 off and transistor 136 on. Since the current in the yoke cannot change instantaneously and since the current in transistor 131 becomes zero immediately, the yoke current previously conducted by diode 141 and transistor 131 is transferred to yoke winding 166 and diode 156, which clamps the negative flyback voltage arising in winding 166. This current decreases at a rate determined by the opposing potentials of −50 volts and +10 volts. Thus, 60 volts is permitted to develop across the yoke windings during the decrease of current in one of the windings. This permits a rapid collapse of the flux in the yoke and a rapid build up of reverse flux for switching current from one winding to the other.

During the transition, diode 146 is reverse-biased and current for the current driver transistors 126 and 136 is conducted by diode 148 from the ground potential terminal. The turn-on voltage for diode 148 is supplied by the voltage drop in base resistor 138 of transistor 136. Current rises in the base circuit of this transistor to a level sufficient to maintain conduction of diode 148. This level of base current does not cause significant saturation of the transistor.

After the yoke current becomes zero, conduction by diode 148 terminates and current in the yoke begins to build up in the reverse direction to the level determined by drivers 126 and 136. This current is conducted totally by diode 146 since the current in diode 148 is now zero. At this time, the voltage across the yoke is approximately 8 volts since the collector of transistor 136 is near ground potential. When the current reaches its new level the voltage across the yoke collapses and a condition similar to the original state arises, except that current is now conducted by diode 146, winding 166, and driver transistors 126 and 136.

An advantage of this amplifier for deflecting a CRT beam from one edge of a tube to the other is that 60 volts is supplied for half of the deflection although the normal bias is only 10 volts. The average voltage across the yoke during a full diameter deflection is, therefore, approximately 35 volts and power dissipation in the output driver transistors is based on only 10 volts. This is an improvement in efficiency over most high speed deflection circuits.

This amplifier reduces the time required for switching from full conduction in one winding to full conduction in the other by almost half. During half of the deflection, the 60 volts appearing across the yoke windings causes the beam to sweep from one edge of the tube to the center in one-twelfth of the ordinary sweep time. The sum of this interval and the ordinary one-half sweep time for the remainder of the deflection results in a total improved deflection time of seven-twelfths of the ordinary interval.

The yoke windings in this amplifier arrangement are divorced from the feedback portion of the amplifier. This permits the amplifier bandwidth to be doubled for small signal operation. Also, the resonant frequency of the yoke does not affect the stability characteristics of the amplifier, which permits the desired higher bandwidth design.

This amplifier is very linear in its operation and no portion is permitted to saturate, although the common base output stage is allowed to approach saturation. As a result, there is little overshoot in the amplifier signal response. This provides quicker signal response since it eliminates the need to provide linear settling time as required for conventional emitter follower amplifiers.

The output amplifier stage of applicant's invention is very efficient in terms of the power required for obtaining a given CRT deflection speed. Relatively low driving currents are necessary for achieving a desired deflection since the deflection yokes to be driven by this amplifier may be of higher inductance than the yokes which may be driven by conventional amplifiers. This is permissible since the yoke is not included in the feedback loop of the amplifier.

Transistors 191 and 196 have their collector-emitter circuits connected between a −50-volt terminal and the junctions between current switch 140 and deflection yoke 160. The collector of transistor 191 is connected to deflection winding 161 and the collector of transistor 196 is connected to deflection winding 166. These transistors are controlled by voltage comparator 180 which compares the signals on input terminals 101 with output current signals sensed differentially across resistors 171 and 176. These transistors conduct in the nonsaturating mode when the difference between the corresponding signals exceeds a predetermined level. This places nearly 60 volts across the deflection windings for rapid gross positioning of the CRT beam. Voltage comparator 180 is not activated during the drawing of vectors or symbols on the CRT since the corresponding output current magnitude does not lag behind the input signal by the predetermined switching level.

One of the clamp diodes 151, 156 also becomes conductive during gross positioning of the CRT beam when current is switched from one of the deflection windings 161, 166 to the other. The current in the −50-volt supply connected to the two −50-volt terminals is, therefore, small. Current is out of the supply through one of the clamp diodes 151, 156 during gross positioning toward the center of the CRT and is into the −50-volt supply through one of the switch transistors 191, 196 when gross positioning is away from the center of the tube. No current is drawn from the −50-volt terminals during the writing of vectors or symbols on the CRT.

The potential terminal connected to clamp diodes 151, 156 may alternatively be positive voltage such as +30 or +50 volts. This, however, would require that another high-voltage supply be provided which would increase the cost of operating the subject amplifier. It would also unbalance the −50-volt supply connected to the emitters of switch transistors 191, 196 and would require expensive large current capabilities of both the −50-volt supply ad of the positive supply connected to the clamp diodes.

Figure 2:
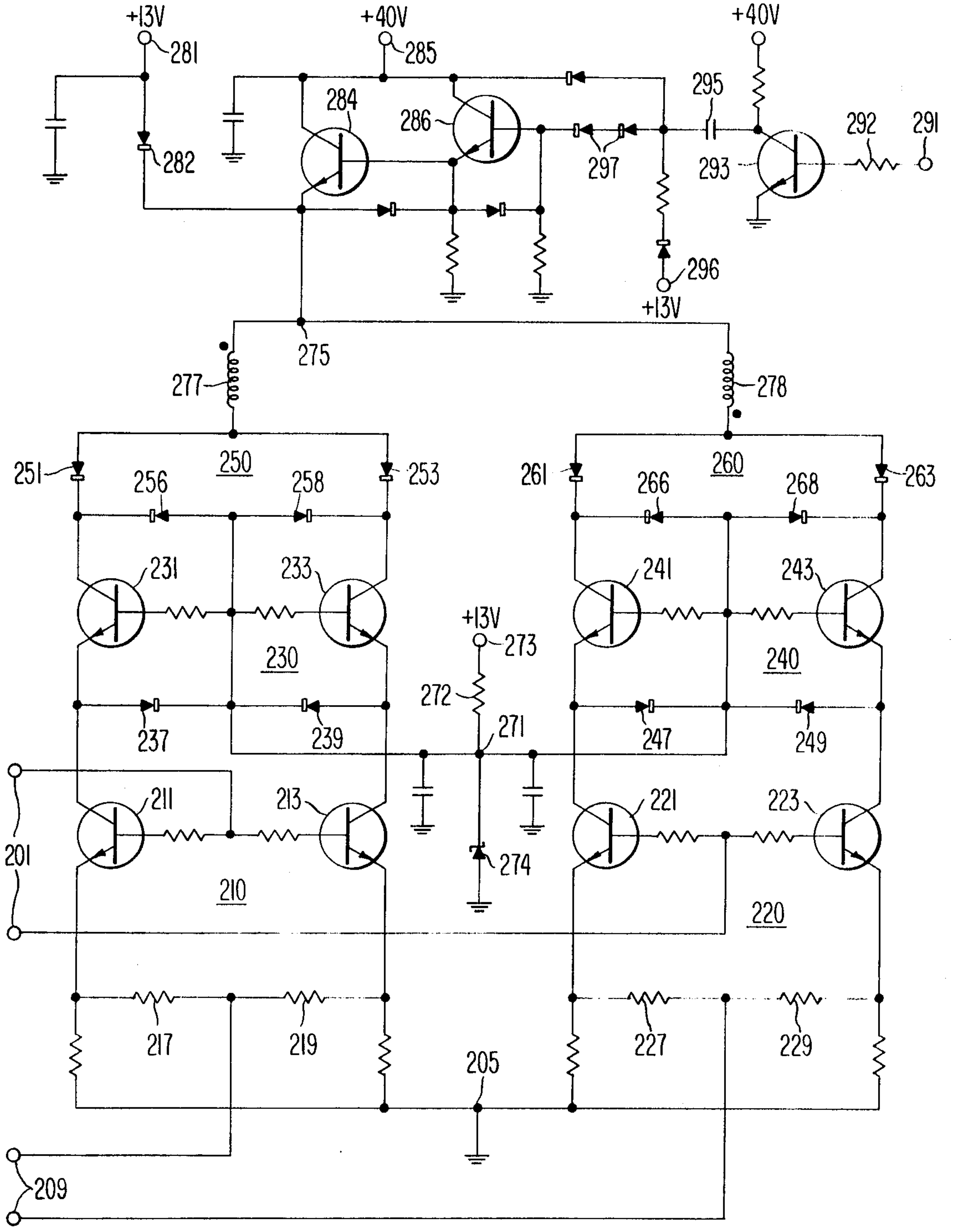

FIG. 2 illustrates the output section of a deflection amplifier conforming to the invention in which each channel of the amplifier is comprised of two parallel stages. The common emitter output stages 210 and 220 are comprised of pairs of NPN transistors 211, 213 and 221, 223, respectively. Differential input signals are applied to the base electrodes of these transistors at input terminals 201. Feedback terminals 209 are connected to the emitters of transistors 211, 213 by resistors 217, 219 and to the emitters of transistors 221, 223 by resistors 227, 229. Common base connected output stages 230 and 240 are likewise comprised of a pair of NPN transistors 231, 233 and 241, 243. The emitters of these transistors are connected to the collector electrodes of the corresponding common emitter stage transistors.

Current switches 250 and 260 of this amplifier include a pair of diodes 251, 253 connected between common base connected transistors 231, 233 and deflection winding 277 and a pair of diodes 261, 263 coupling common base connected transistors 241, 243 to deflection control winding 278. Also, pairs of diodes 256, 258 and 266, 268 couple the collectors of common base connected transistors 231, 233 and 241, 243 to a potential terminal 271.

Normal operating bias for the circuit of FIG. 2 is provided between terminal 281 and ground terminal 205. A positive switching bias is provided at circuit point 271 which is coupled to +13-volt terminal 273 by resistor 272 and is connected to the cathode of Zener diode 274, the anode of which is grounded.

Circuit point 275 is connected to an end of opposed deflection windings 277 and 278, and coupled to +13-volt terminal 281 by diode 282 connected to the emitter electrode of transistor 284. The base electrode of transistor 284 is connected to the emitter of transistor 286 and the collectors of both are connected to +40-volt bias terminal 285. The base of transistor 286 is driven from the collector of transistor 293 through capacitor 295 and diodes 297. The base electrode of transistor 293 is coupled to control terminal 291 by resistor 292.

The conduction of drive current for deflection winding 277 is shared by transistors 211 and 213 of common emitter stage 210 by transistors 231 and 233 of common base output stage 230 and also by diodes 251 and 253 of current switch 250. Drive current for deflection winding 278 is shared by transistors 221 and 223 of common emitter stage 220, by transistors 221 and 223 of common base output stage 240 and also by diodes 261 and 263 of current switch 260.

During the switching of drive current from deflection coil 277 to deflection coil 278, responsive to a polarity reversal in the signals at input terminals 201, the yoke current resulting from flyback voltage is shared by diodes 251 and 253, by transistors 231 and 233, and also by diodes 237 and 239. This current is conducted to circuit point 271 and ultimately to +13-volt supply terminal 273 through resistor 272. At the same time, operating current for transistors 241 and 243 of output stage 240 and transistors 221 and 223 of common emitter stage 220 is conducted by diodes 266 and 268, respectively, from circuit point 271 and ultimately from +13-volt terminal 273 through resistor 272. During this transition period the flux in the yoke begins to collapse and current is conducted out of winding 277, while the circuit paths for winding 278 are blocked by diodes 261 and 263 which are reverse biased.

The conduction of switching current into circuit point 271 from deflection coil 277 and out of circuit point 271 through diodes 266 and 268 and transistors 241 and 243 results in very little current drain from the +13-volt supply at terminal 273. Similar temporary currents are conducted into and out of circuit point 271 during the switching of current from deflection winding 278 to deflection winding 277.

Normal operating bias is applied to circuit point 275 through diode 282 from +13-volt bias terminal 281. More rapid deflection of a CRT beam by windings 277 and 278 is provided by actuating transistors 284 and 286 through transistor 293 and control terminal 291, which couples +40-volt bias terminal 281 to the coils. This increases the rate of change of current in the windings and the rate of change of flux in the signals applied to input terminals 201.

Figure 3:
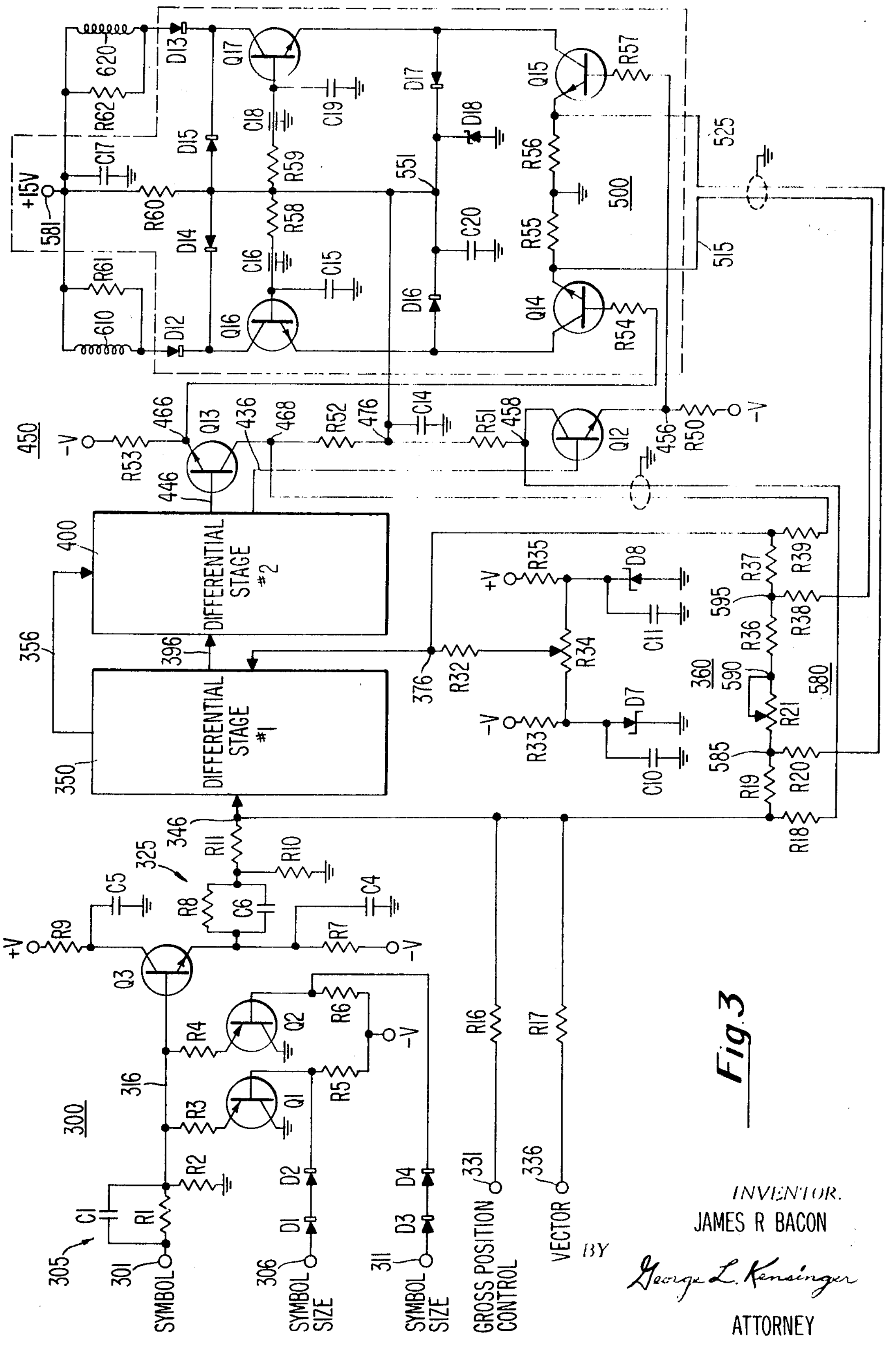

FIG. 3 illustrates another embodiment of applicant's invention adapted for controlling deflection along an axis of a CRT display surface. Control signals are received by input amplifier 300, the output of which is applied to differential amplifier stage 350 together with a reference voltage from centering voltage supply 360. This develops differential control signals which are applied to differential amplifier stage 400. The outputs of differential amplifier 400 are applied to the input terminals of buffer amplifier 450, the outputs of which are applied to the input terminals of output stage 500. Opposed deflection control windings 610 and 620, which are critically damped by resistors R61 and R62, respectively, are connected to the output terminals of output stage 500. Also connected across the input terminals of the differential amplifier stage 350 is gain control and multiple feedback circuit 580, which receives degenerative feedback signals from both buffer amplifier 450 and from output stage 500.

Referring more particularly to input stage 300, a symbol or stroke control signal is applied to input terminal 301 and a symbol size control signal may be applied to either terminal 306 or to terminal 311 for each symbol segment or stroke having a component along the axis controlled by deflection windings 610, 620. Symbol stroke signals applied to terminal 301 appear on conductor 316 and control the conduction of transistor Q3. Symbol size signals applied to terminals 306 and 311 control the operation of transistors Q1 and Q2, respectively, which affect the level of conduction of transistor Q3.

The stroke signals generated by transistor Q3 are applied to output terminal 346, as are gross position control signals applied to input terminal 331 and vector control signals applied to input terminal 336. Networks 305 and 325 are "zero" compensation networks provided to compensate for the double poled frequency response characteristics of the critically damped deflection windings 610,620 connected to the output of the amplifier. These two networks introduce a rising 12 db. characteristic into the amplifier to compensate for the two poles of the critically damped yoke, each of which would otherwise result in a 6 db. per octave drop-off in the amplifier response characteristic.

Differential amplifier stage 350 responds differentially to the signals and reference levels applied at terminals 346 and 376 and produces differential output signals on conductors 356 and 396, which are applied to differential amplifier stage 400. The level appearing at terminal 376 is a centering reference voltage provided from potentiometer R34 connected between negatively and positively biased reference diodes D7 and D8. Any suitable voltage reference circuit may be substituted for circuitry 360 to provide the centering reference voltage to terminal 376. The output signals from differential stage 400 appear on conductors 436 and 446.

Buffer amplifier 450 is comprised of a pair of transistors Q12 and Q13 having their base electrodes connected to conductors 436 and 446, and having their emitter electrodes connected to output terminals 456 and 466, respectively. Their collector electrodes are coupled to circuit point 476 through resistors R51 and R52, respectively, and to R18 and R39 of gain and feedback control circuit 580.

Common emitter connected transistors Q14 and Q15 form a first stage of output amplifier 500 and have their base electrodes coupled to buffer amplifier output terminals 466 and 456 through resistors R54 and R57, respectively. Their emitter electrodes are connected by conductors 515 and 525, respectively, to resistors R20 and R38 of feedback and gain control circuit 580.

Ground base connected transistors Q16 and Q17 form a second stage of output amplifier 500. Their emitter electrodes are connected to the collector electrodes of transistors Q14 and Q15 of the first stage and to the anodes of diodes D16 and D17, respectively. The cathodes of diodes D16 and D17 are connected to circuit point 551, as is the cathode of grounded reference diode D18, bias terminal 476 of buffer amplifier 450 and one end of base resistor R58 and R59 of transistors Q16 and Q17.

Current switch diodes D12 and D13 couple the collector electrodes of common base connected transistors Q16 and Q17 to deflection windings 610 and 620, respectively. Current switch diodes D14 and D15 couple the collector electrodes of transistors Q16 and Q17 to circuit voltage reference point 551, which is coupled to +15-volt bias terminal 581 by resistor R60.

Feedback and gain control 580 comprises series-connected resistor R19, potentiometer R21, resistor R36 and resistor R37 separated by circuit points 585,590 and 595, respectively. Circuit point 590 is also connected to the wiper arm of the potentiometer. The other ends of resistors R19 and R37 are connected to input terminals 346 and 376, respectively, of differential amplifier stage 350. Degenerative feedback from buffer amplifier 450 is coupled to terminals 346 and 376 by resistors R18 and R19 as previously mentioned and feedback from output amplifier 500 is coupled to circuit 585 and 595 of feedback and gain control circuit 580 by resistors R20 and R38.

Amplifier output stage 500 is driven from output terminals 456 and 466 of buffer amplifier stage 450. These stages are controlled by tandem differential amplifier stages 350 and 400. The signal level in deflection windings 610 and 620 ideally should be proportional to the difference between the potentials applied at input terminals 346 and 376 of differential stage 350. Transistors Q12 and Q13, however, introduce a discrepancy in the signal transfer from the differential stages into the output stage as a result of the Q12 and Q13 base current which is added to the signals conducted to output stage 500.

Common emitter connected transistors Q14 and Q15 and common base connected transistors Q16 and Q17 likewise introduce error into the deflection control signals as a result of their base current terms. The base current terms of transistors Q12 and Q13 are compensated for coupling negative feedback from collector terminals 458 and 468 to resistors R18 and R39, respectively, of multiple feedback and gain control circuit 580. The base current error terms of the transistors of output stage 500 are compensated for by connecting degenerative feedback from the emitters of transistors Q14 and Q15 by conductors 515 and 525 to resistors R38 and R20, respectively, of feedback and gain control circuit 580. Applicant has found that feedback taken from the emitters of transistors Q14 and Q15 can compensate for the base current term errors of all four transistors of output stage 500. If desired, however, separate feedback may be coupled from common emitter connected transistors Q14 and Q15 and from common base connected transistors Q16 and Q17 for separately compensating for the corresponding base current term errors.

An advantage of feedback and gain control circuit 580 coupled across input terminals 346 and 376 of differential amplifier stage 350 is that the gain in the amplifier may be thereby adjusted symmetrically about the centering reference voltage. This applies to adjustment both manually and by the feedback paths coupled to it. This allows the information displayed on the face of a CRT to be centered thereon and to be controlled in the area about the center of the surface. Adjustment of the position of wiper 590 of potentiometer R21 equally controls deflection of the CRT beam by deflection windings 610 and 620. Likewise, the feedback from buffer amplifier 450 and output stage 500 symmetrically affects the gain of the amplifier through connection to feedback and gain control circuit 580.

The current drivers in the several embodiments of the invention have been illustrated as transistors, however, other forms of current drivers may be used, such as vacuum tubes, or their equivalents.

Although different embodiments of the present invention have been described in detail, it should be understood that the present disclosure has been for example only and that many modifications and variations of the present invention are possible in the light of the above teachings. It is, therefore, to be understood that within the scope of the appended claims, the invention may be practiced otherwise than as specifically described.

I claim:

1. An amplifier for switching current from one inductive load to another, comprising:
   - first, second and third potential terminals,
   - a pair of independently controlled current driving means each for supplying current to one of said inductive loads and each having a reference terminal electrically coupled to said first potential terminal and each having an input control terminal and a current output terminal,
   - a pair of first asymmetrically conductive circuit means electrically coupling the output terminals of the current driving means to the second potential terminal,
   - a pair of second similarly poled asymmetrically conductive circuit means for electrically coupling the current driving means output terminals to different inductive loads, and
   - means for electrically coupling said third potential terminal to other terminals of said inductive loads.

2. An amplifier in accordance with claim 1 further comprising input means electrically coupled for applying control signals to the input terminals of the current driving means responsive to input signals applied to it for turning on one current driving means and turning off the other current driving means, and degenerative feedback means electrically coupled from the current driving means output terminals to the input means.

3. An amplifier in accordance with claim 1 further comprising differential amplifier means electrically coupled to the current driving means input terminals, having control terminals for receiving input signals and a reference voltage, and having gain control means electrically coupled between the control terminals.

4. The amplifier of claim 1 wherein the different inductive loads are opposed deflection control windings of a CRT device, further comprising a fourth potential terminal and a pair of third asymmetrically conductive circuit means for electrically coupling the fourth potential terminal to the junctions of the second asymmetrically conductive circuit means and the loads.

5. The amplifier of claim 4 wherein the means coupling the third potential terminal to the loads comprises a voltage switch responsive to gross positioning control signals applied to its input terminal and fourth asymmetrically conductive circuit means for electrically coupling the second potential terminal also to said other terminals of the loads.

6. The amplifier of claim 1 further comprising a fourth potential terminal and a pair of voltage switches for electrically coupling the fourth potential terminal to the junctions of the second circuit means and the inductive loads and each having a control terminal, and comparator means electrically coupled for monitoring the current in the loads and the signals applied to the current driving means input terminals and coupled for activating either switch if the corresponding load current and input signals differ by more than a prescribed amount.

7. An amplifier in accordance with claim 6 further comprising a pair of third asymmetrically conductive circuit means also for electrically coupling the fourth potential terminal to the junctions of the second asymmetrically conductive circuit means and the loads to be driven.

8. The amplifier of claim 1 further comprising a pair of second current driving means each having a reference terminal electrically coupled to the second potential terminal and each being coupled for conducting current between the output terminals of one of the independently controlled current driving means and one of the second asymmetrically conductive circuit means.

9. The amplifier of claim 8 further comprising input means electrically coupled for applying control signals to the input terminals of said independently controlled current driving means responsive to input signals applied to it for turning on one of said independently controlled current driving means and turning off the other independently controlled current driving means, and feedback means electrically coupled from the output terminals of said independently controlled current driving means to the input means.

10. The amplifier of claim 9 further comprising a pair of emitter-follower amplifiers electrically coupled between the input means and the independently controlled current driving means and second feedback means coupled from the emitter-follower output terminals to the input means.

11. An amplifier in accordance with claim 8 further comprising differential amplifier means electrically coupled to the independently controlled current driving means input terminals, having control terminals for receiving input signals and a reference voltage, and having gain control means electrically coupled between the control terminals of the differential amplifier means.

12. The amplifier of claim 8 wherein the different inductive loads are opposed deflection control windings of a CRT device, further comprising a pair of third asymmetrically conductive circuit means electrically coupling the second potential terminal to the junction of the two pairs of current driving means.

13. An amplifier accordance with claim 8 further comprising a fourth potential terminal and a pair of third asymmetrically conductive circuit means for electrically coupling the fourth potential terminal to the junctions of the second asymmetrically conductive circuit means and the loads.

14. The amplifier of claim 8 wherein the independently controlled current drivers and the second current drivers are common-emitter and common-base transistor amplifiers, respectively, further comprising a voltage breakdown device coupled between the first and second potential terminals.

15. An amplifier in accordance with claim 12 in which the deflection control windings are critically damped, further comprising input means electrically coupled for applying control signals to the input terminals of said independently controlled current driving means, comprising zero compensation means to insert a rising frequency response characteristic into the amplifier for the poles in the frequency response of the critically damped windings.

PO-1050
(5/69)

UNITED STATES PATENT OFFICE
CERTIFICATE OF CORRECTION

Patent No. 3,611,001 Dated Oct. 5, 1971

Inventor(s) James R. Bacon

It is certified that error appears in the above-identified patent and that said Letters Patent are hereby corrected as shown below:

Column 4, line 5, change "back" to --feedback--. Column 6, line 36, change "ad" to --and--. Column 7, line 7, change "221 and 223" to --241 and 243--. Column 12, line 1, after "means" insert --for turning on one of said independently controlled current driving means and turning off the other independently controlled current driving means--(As requested in the Amendment dated December 3, 1970.)

Signed and sealed this 16th day of May 1972.

(SEAL)
Attest:

EDWARD M.FLETCHER,JR.
Attesting Officer

ROBERT GOTTSCHALK
Commissioner of Patents